United States Patent [19]

Crates et al.

[11] 4,363,732

[45] Dec. 14, 1982

[54] INLET AND OUTLET BAFFLE STRUCTURE FOR SEWAGE TREATMENT TANKS

[75] Inventors: Fred J. Crates; James L. Fouss; John J. Parker, all of Findlay, Ohio

[73] Assignee: Hancor, Inc., Findlay, Ohio

[21] Appl. No.: 152,186

[22] Filed: May 22, 1980

[51] Int. Cl.³ .......................................... B01D 21/02
[52] U.S. Cl. ................................................ 210/532.2
[58] Field of Search ..................... 210/532.2, 800, 801, 210/513, 532.1

[56] References Cited

U.S. PATENT DOCUMENTS

| | | |
|---|---|---|
| 791,078 | 5/1905 | Corson . |
| 953,967 | 4/1910 | Mueller . |
| 2,086,154 | 7/1937 | Boggs ........................... 210/532.2 X |
| 2,781,311 | 2/1957 | Brundage ...................... 210/532.2 X |
| 2,791,450 | 5/1957 | Hombach ........................... 285/156 |
| 3,630,370 | 12/1971 | Quina .......................... 210/532.2 X |
| 3,709,527 | 1/1973 | Nations ............................. 285/110 |
| 3,826,376 | 7/1974 | Carlson et al. ............... 210/532.2 X |
| 3,875,066 | 4/1975 | Lind ............................. 210/532.2 X |

OTHER PUBLICATIONS

Bowman et al., "Septic Tanks," presented at the Proceedings of the Second National Home Sewage Treatment Symposium, 1967.

Primary Examiner—Thomas G. Wyse
Attorney, Agent, or Firm—Fay & Sharpe

[57] ABSTRACT

This application discloses a septic tank construction including an inlet baffle structure and an outlet baffle structure for reducing the turbulence in the liquid or clear zone of the septic tank. The tank has oppositely disposed arcuate end walls which bow outward. In one of the end walls is an inlet for receiving incoming raw sewage. Connected with the inlet is an inlet baffle structure for introducing the incoming sewage into the fluids in the tank with a minimum of turbulence. The inlet baffle structure comprises a generally tubular structure which is connected with the inlet and terminates in a fluid introducing flared opening disposed toward the end wall. The fluid introducing opening is oval in cross section with its major axis extending vertically. In the other end wall is an outlet for discharging treated fluids to the disposal field. An outlet baffle structure for receiving treated fluids to be discharged is connected with the outlet. The outlet baffle structure comprises a tubular structure which is connected with the outlet and which terminates in a flared fluid receiving opening disposed toward the end wall. The fluid receiving opening is oval in cross section with its minor axis extending vertically.

8 Claims, 9 Drawing Figures

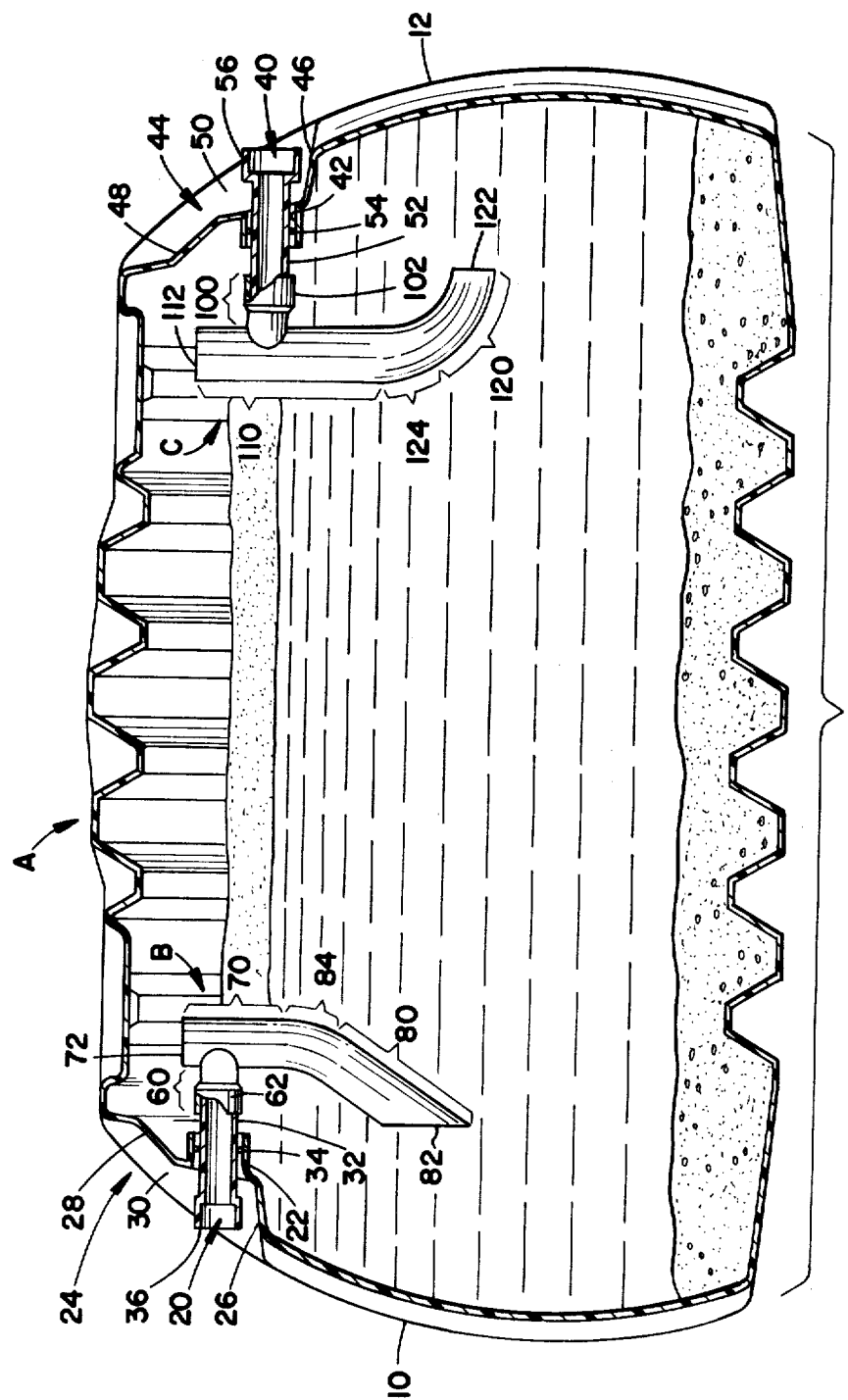

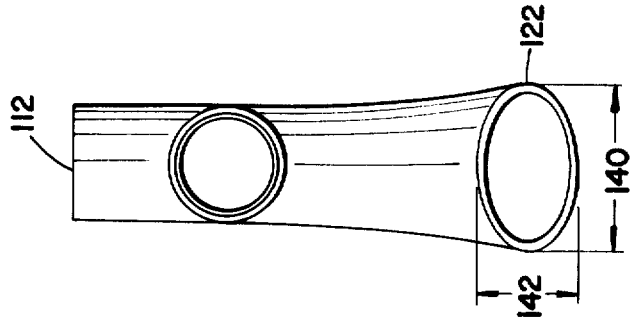
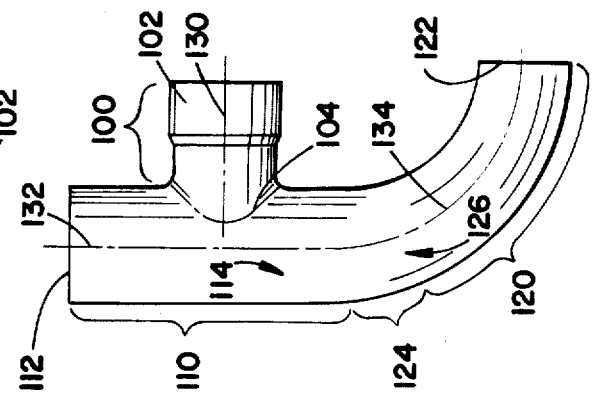
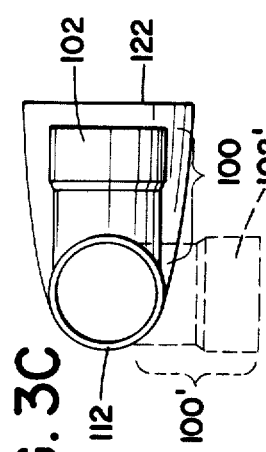
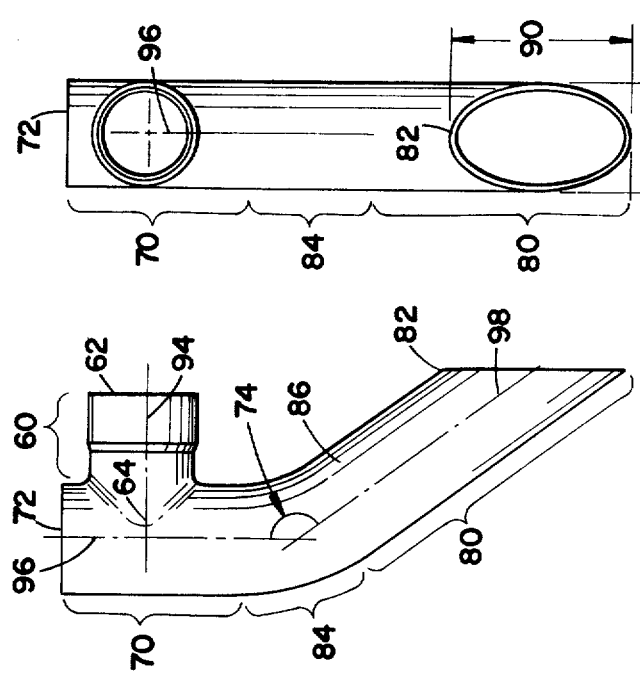
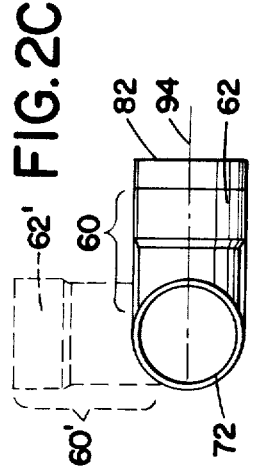

INLET AND OUTLET BAFFLE STRUCTURE FOR SEWAGE TREATMENT TANKS

BACKGROUND OF THE INVENTION

This application relates to the art of sewage treatment and more particularly to inlet and outlet baffle structures for use in conjunction with septic and other sewage treatment tanks. The invention finds particular utility in conjunction with molded plastic tanks having arcuate end walls and will be described with reference thereto. It will be appreciated, however, that the invention finds application in other treatment tanks which are constructed of concrete, concrete block, plastic, metal, and other materials and which are configured in rectangular prisms, cylinders, spheres, and other shapes.

Most commonly, the inlet and outlet baffles of septic tanks comprise generally T-shaped structures. Specifically, the stem of the T connects with the horizontal inlet or outlet pipe. The cross bar of the T commonly extends into the air space at the top of the tank to act as a vent and extends below the scum layer into the liquid or clear zone of the tank. The inlet baffle functions to drop the incoming sewage directly in the liquid or clear zone of the sewage treatment tank. The outlet baffle functions to block the scum from being discharged into the disposal field. Rather, liquids from the liquid or clear zone of the septic tank are drawn off by the outlet baffle for distribution through the disposal field.

It has been recognized that the gas bubble rising in the liquid or clear zone of the septic tank should be prevented from entering the outlet baffle to reduce the flow of suspended solids into the absorption field and slow soil pore clogging. This has been achieved by disposing a deflector below the outlet Tee, by fastening a special outlet box projecting outward from the side of the septic tank wall, or the like.

One of the problems with the prior art septic tank structures has been the turbulence in the liquid or clear zone caused by the entrance of incoming sewage and the discharge of treated fluids. Such turbulence tends to interfere with the normal settling of sludge from the liquid in the clear zone. The turbulence tends to hold particles suspended in the liquid.

Further the turbulence and relative placement of the inlet and outlet baffles have tended to allow shortcircuiting of raw sewage from the inlet directly to the outlet baffle. In shortcircuiting, raw or partially treated sewage is discharged into the distribution system too quickly for the anaerobic bacteria in the clear zone of the septic tank to treat it properly and for settling to occur.

SUMMARY OF THE INVENTION

The present invention provides new and improved inlet and outlet baffle structures which overcome the above-referenced problems and others yet provide a treatment system which is simple, economical, and effective.

In accordance with the present invention, there is provided a sewage treatment construction for minimizing fluid turbulence from the ingress of incoming sewage and the egress of treated and settled fluids. The construction comprises a tank for holding sewage for treatment which includes a first end wall having an inlet for receiving the incoming sewage and a second end wall having an outlet for discharging the treated and settled fluids. The construction further comprises an inlet baffle structure for introducing incoming sewage into the tank. The inlet baffle structure comprises a first generally tubular structure which is in fluid connection with the inlet and which defines a fluid introducing opening through which incoming sewage is introduced into the tank. The fluid introducing opening is disposed substantially in a vertical plane. The construction further comprises an outlet baffle structure for receiving treated fluid to be discharged from the tank through the outlet. The outlet baffle structure comprises a generally tubular structure which is in fluid connection with the outlet and which defines a fluid receiving opening through which treated and settled fluids are received for discharge from the tank. The fluid receiving opening is disposed substantially in a vertical plane. The fluid introducing opening and the fluid receiving opening face generally away from each other.

In accordance with another aspect of the invention, there is provided a baffle construction for reducing turbulence in fluids in a sewage treatment tank. The baffle structure comprises a first generally tubular portion having a coupling at one end. The coupling is adapted to connection with an inlet or outlet of a sewage treatment tank. The baffle structure further comprises a second generally tubular portion which has a vent at one end. The second generally tubular portion is in fluid connection with the other end of the first generally tubular portion. The baffle structure further comprises a third generally tubular portion which defines an opening at one end. The third generally tubular portion is divergent from a first relatively small cross section adjacent said second generally tubular portion to a second relatively large cross section adjacent the opening. The baffle structure further comprises a transition zone for providing fluid connection between the other end of the second generally tubular portion and the other end of the third generally tubular portion.

A principle advantage of the invention is that it promotes tranquility in the liquid or clear zone and reduces turbulence of the liquid phases of the sewage treatment. The invention is advantageous in that it reduces the ingress velocity of incoming sewage and the egress velocity of treated and settled fluids.

Another advantage of the present invention is that it inhibits gases from entering the inlet and outlet conduits thus reducing suspended solids escaping on ascending gas bubbles.

Yet another advantage of the present invention is that it inhibits shortcircuiting of raw sewage directly from the inlet baffle to the outlet baffle.

BRIEF DESCRIPTION OF THE FIGURES

The drawings are for the purpose of illustrating a preferred embodiment of the invention only. They are not to be construed as limiting the scope of the invention.

FIG. 1 is a vertical cross section of a septic tank construction in combination with inlet and outlet baffle structure in accordance with the present invention;

FIGS. 2A, B, and C are side, end, and top plan views, respectively, of the inlet baffle structure of FIG. 1;

FIGS. 3A, B, and C are side, end, and top plan views, respectively, of the outlet baffle structure of FIG. 1;

DESCRIPTION OF THE PREFERRED EMBODIMENT

Figure 4:
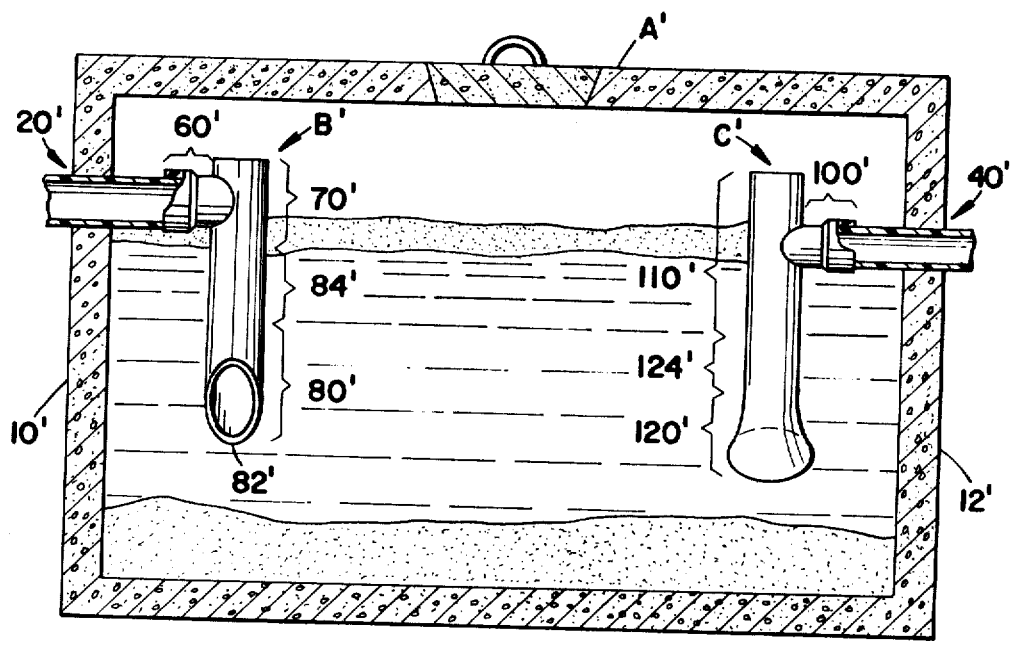
FIG. 4 is a vertical cross section of a septic tank construction in combination with an alternate embodiment of the present invention.

With reference to FIG. 1, the figure shows a septic or other sewage treatment tank A in combination with an inlet baffle structure B and an outlet baffle structure C. Raw sewage is received by the inlet baffle structure B which introduces it gently into the liquid or clear zone of the septic tank. Anaerobic bacteria in the liquid zone digest the raw sewage. During the anaerobic digestion process, solids settle and are deposited in a sludge layer at the bottom of the septic tank and lighter sewage components, such as grease, float through the liquid zone to form a layer of scum. Gas bubbles given off during the anaerobic digestion, also rise to the top of the liquid zone. The gas bubbles frequently lift small suspended particles. When incoming sewage is received, the liquid level in the tank rises. When the liquid level exceeds the level of the outlet, treated and settled fluids, i.e. fluids which have deposited most of the larger suspended solids, are forced by gravity through the outlet baffle to a disposal field.

The septic tank A comprises a first arcuate end wall 10 which bows outward in a generally domelike configuration. At the opposite end of the tank is a second arcuate end wall 12 which also bows outward in a generally domelike configuration. In the preferred embodiment, the end walls are corrugated, spherical segments. Between the arcuate end walls 10 and 12, a corrugated central section 14 is disposed. The corrugated central section 14 comprises a generally large radius of curvature corrugated bottom wall and a pair of arcuate corrugated side walls which extend from the bottom wall and meet at an apex area.

Disposed in the first arcuate end wall 10 is an inlet 20 which is defined by an annular collar 22. The annular collar 22 is disposed in a recessed indentation area 24 of the first end wall 10 which is recessed inward. The indentation area protects the inlet and connections with the inlet from impact during shipping and handling and from settling and other forces after subterranean installation. The indentation area includes a sloping bottom wall 26 and a back wall 28. The bottom wall and back walls connect with the arcuate first end wall 10 and with each other. The inlet annular collar 22 is integrally formed with the back wall 28. A pair of side walls, of which side wall 30 is shown in the drawings, is connected between the arcuate first end wall 10, bottom wall 26, and back wall 28. A spigot or tubing section 32 extends through annular collar 22. An O-ring 34 provides a fluid seal between spigot 32 and annular collar 22. The spigot has a bell coupling 36 at one end for receiving a sewage line. The inlet baffle B is secured to the other end. The spigot 32 is longer than collar 22 to enable the spigot to move longitudinally through the annular collar if the septic tank A or the sewage line should expand, contract, settle, or the like.

Disposed in the second arcuate end wall 12 is an outlet 40. The outlet 40 is defined by an annular outlet collar 42 which projects toward the interior of the tank A. The outlet, like the inlet, is disposed in an indentation area 44 which is recessed from the second arcuate end wall 12 towad the interior of the tank. This protects the outlet and connection with the outlet during shipping and installation as well as after its subterranean installation. The recessed indentation area is defined by a gently sloping bottom wall 46, a back wall 48, and a pair of side walls, of which side wall 50 is shown in FIG. 1. An outlet spigot or tubing section 52 extends through annular collar 42. An O-ring 54 provides a fluid seal between spigot 52 and the annular collar 42. The spigot 52 has a bell coupling 56 at one end for connection with an outlet line to the distribution field. The outlet baffle C is connected with the other end of spigot 52. The spigot is longer than annular collar 42 to permit relative longitudinal movement between the spigot and the annular collar.

With reference now to FIGS. 1 and 2, the inlet baffle structure B has a first generally tubular portion 60. The tubular portion 60 has a coupling 62 at one end which is adapted to be received on the inlet spigot 32. The other end 64 of the first tubular portion 60 is connected with a second generally tubular portion 70. The second tubular portion 70 has a vent aperture disposed at one end 72. A third generally tubular portion 80 defines an elongated opening 82 at one end for introducing fluid and sewage materials into the tank. A transition zone 84 provides a fluid connection between the other end 74 of the second tubular portion 70 and the other end 86 of the third generally tubular portion 80.

The cross section of the first generally tubular portion 60 and the coupling 62 in a first generally vertical plane is circular. The cross section of the second generally tubular portion 70 is similarly circular. The third generally tubular portion is divergent from a first relatively smaller circular cross section adjacent the second generally tubular portion to a second relatively larger oval cross section adjacent the opening 82. The fluid introducing opening 82 which is defined by the one end of the third generally tubular portion 80 is generally oval and has a major axis 90 extending in the vertical direction and a minor axis 92 extending in the horizontal direction. The dimension of the major axis 90 in the vertical direction is about 8 inches and the dimension of the minor axis 92 in the horizontal direction is about 4½ inches. Thus the major axis is about 1½ to 2 times the minor axis. The dimension of the diameter of the first and second generally tubular portions is substantially the same as the dimension of the minor axis. It is contemplated that the cross section of the generally tubular portions may be other than circular such as square, rectangular, or the like. Similarly, the elongated fluid introducing opening 82 may be rectangular, square, triangular, ovoid, semicircular, or the like.

Further in the preferred embodiment, the first generally tubular portion 60 extends along a first substantially horizontal axis 94, the second generally tubular portion 70 extends along a second axis 96 and said third generally tubular portion 80 extends along a third axis 98. The second axis 96 and the third axis 98 are disposed at an angle of generally 130 to 155 degrees. Specific to the preferred embodiment, the angle is 143½ degrees. The first axis 94, the second axis 96, and the third axis 98 are substantially coplanar in a common inlet plane. The elongated fluid introducing opening 82 is disposed in a second plane which is parallel to the cross section of the first tubing portion 60 or coupling 62. The major axis 90 of the elongated fluid introducing opening is parallel with the second axis 96 and lies in the common inlet plane of the first, second and third axis. The minor axis 92 is perpendicular to the major axis 96 and the common inlet plane. The fluid introducing opening is disposed farther from the second axis 96 than is coupling 62. This brings the fluid introducing opening closer to the first arcuate end wall 10. Also disposed in the common inlet plane is a recessed central valley portion of the corrugations in the first end wall 10. The valley portion is generally triangular in cross section. Incoming raw sewage is received in the first tubular portion 60 and drops vertically through the second tubular portion 70. The sewage is slowed by the lower surface of the third tubular portion 80 which absorbs some of its kinetic energy and reduces its velocity. The enlarged, diverging third tubular portion 80 and the fluid introducing opening 82 further reduce the entrance velocity of the sewage. The sewage with the reduced velocity is discharged from fluid introducing opening 82 generally toward the first arcuate side wall 10. The central valley portion deflects peripherally any component of the velocity which reaches it. The reduced velocity and directing the velocity component outward toward the end wall of the tank reduces the turbulence in the liquid or clear zone. The inward recess of the inlet 20, and the outward arcuate side wall 10 cooperate to dispose the fluid introducing opening 82 sufficiently distant from the end wall 10 that incoming sewage may be discharged toward the side wall without clogging or detrimental interactions. Discharging the incoming sewage toward the arcuate end wall not only decreases the turbulence but also reduces the tendency for incoming sewage materials to reach the outlet before being fully treated. If the third axis 98 were disposed more horizontally, more kinetic energy from the incoming sewage materials would be absorbed, but the tendency for the sewage materials to clog the third tubular section 80 would be increased. Disposing the third axis at about 36½ degrees to the vertical enables the third section to absorb a large component of the kinetic energy of the incoming sewage without a substantial tendency for the third tubular section to become clogged.

With reference now to FIGS. 1 and 3, the outlet baffle structure comprises a first generally tubular portion 100. The first tubular portion 100 has a coupling 102 at one end which is adapted to be received on the spigot 52. The first tubular portion 100 is connected at its other end 104 with a second generally tubular portion 110. The second tubular portion 110 has a vent aperture 112 at one end. A third generally tubular portion 120 defines an elongated opening 122 at one end for receiving treated fluid. The third generally tubular portion 120 is divergent from a first relatively smaller cross section adjacent the second generally tubular portion 110 to a second relatively larger cross section adjacent the fluid receiving opening 122. The enlarged cross section at the fluid receiving opening reduces the egress velocity of received fluids at the opening. A transition zone 124 provides a fluid connection between the other end 114 of the second tubular portion 110 and the other end 126 of the third tubular portion 120.

The first tubular portion 100 extends along a first axis 130. When installed in the septic tank A, the first axis 130 is disposed substantially horizontally. The second tubular portion 110 extends along a second axis 132. The third tubular portion 120 extends along a substantially circular arc segment 134. The first axis 130 is disposed substantially perpendicular to the second axis 132. The first axis 130, the second axis 132, and the circular arc segment 134 are disposed in a common outlet plane. When installed in the tank, the common outlet plane is substantially vertical and coplanar with the common inlet plane.

In the preferred embodiment the cross section of the first tubular section 100 and coupling 102 in a first substantially vertical plane is substantially circular. Similarly, the cross section of the second tubular portion 110 is circular. The cross section of the elongated fluid receiving opening 122 in a second substantially vertical plane is substantially oval. The third generally tubular portion is divergent from a generally circular cross section adjacent the second generally tubular portion to a generally oval cross section adjacent the fluid receiving opening. The oval has a major axis 140 which is disposed perpendicular to the common outlet plane and a minor axis 142 which is disposed in the common outlet plane and substantially parallel to the second axis 132. The fluid receiving opening 122 is disposed farther from the second axes 132 than is coupling 102. This places the fluid receiving opening 122 closer to the second end wall 12 of the tank. It is contemplated, however, that other cross sections such as square, rectangular, octagonal and the like may be used for the cross sections of the first tubular portion 100, the second tubular portion 112 and the fluid receiving opening 122. In the preferred embodiment, the major axis is 7 inches long and the minor axis is about 3½ inches. It is preferred that the major axis be about twice the dimension of the minor axis.

When sewage is introduced into the tank, the level of liquid in the liquid or clear zone is raised. The force of gravity on the liquid in the clear zone forces liquid through the outlet baffle structure until the level of the liquid reaches the level of the bottom of outlet 40. Because the fluid receiving opening is enlarged, the velocity of the discharged fluid is less at the fluid receiving opening than in the first and second generally tubular portions and the outlet line to the distribution field which are smaller in cross section. The size and orientation of the fluid receiving opening reduces the amount of turbulence caused by fluid being received by the outlet baffle. Further disposing the fluid receiving outlet 122 vertically in addition to helping reduce turbulence, also inhibits the outlet baffle from receiving rising gas bubbles released by the anaerobic bacteria.

FIG. 4 illustrates an alternate embodiment in which the present invention is utilized in conjunction with a rectangular prism shaped septic tank. In FIG. 4, like elements are indicated with the same reference numeral as the corresponding element of FIGS. 1-3 followed by a prime ('). An inlet opening 20' which is defined by a length of tubing is disposed in a first side wall 10' of the septic tank A'. With reference also to FIG. 2C, a first tubular portion 60' of the inlet baffle is connected with the inlet length of tubing. The first tubular portion 60' extends along a first generally horizontal axis. A second generally tubular portion 70' is connected with the end of the first generally tubular portion 60'. The second tubular portion extends along a second vertical axis which is perpendicular to the first axis. A transition zone 84' connects the second tubular portion 70' with a third tubular portion 80'. The third tubular portion terminates in a fluid introducing opening 82'. The third tubular portion 80' is divergent from a relatively smaller cross section adjacent the transition zone 84' to a relatively larger cross section adjacent the fluid introducing opening 82'. The third tubular portion extends along a third axis. The second and third axes lie in a common plane which is perpendicular to the first axis. This orients the fluid introducing opening 82' facing toward a side wall of the septic tank.

An outlet opening 40' which is defined by a length of tubing is disposed in a second side wall 12' of the septic tank. Also with reference also to FIG. 3C, the inlet baffle has a first generally tubular portion 100' which is connected with the outlet tubing length. The first generally tubular portion 100 extends along a first axis. Connected with one end of the first generally tubular portion is a second generally tubular portion 110' extending along a second axis. The first and second axis are substantially perpendicular to each other. Connecting the second tubular section 110' with a third generally tubular section 120' is a transition zone 124'. The third generally tubular portion 120' extends along a generally circular arc segment. The second and third generally tubular portions lie in a common plane which is substantially perpendicular to the first axes. The third generally tubular portion 120' terminates in a fluid receiving opening which is disposed facing toward the opposite side wall of the septic tank than fluid introducing opening 82'. The fluid introducing opening and the fluid receiving opening thus face away from each other, specifically they are offset relative to each other by 180 degrees. It is contemplated that the fluid introducing opening and the fluid receiving opening may face away from each other by less than 180 degrees. For example, the fluid introducing opening and the fluid receiving opening may be rotated 45 degrees toward the center of the tank. This causes the fluid introducing opening and the fluid receiving opening to be offset relative to each other by about 90 degrees. Alternately the fluid introducing opening and the fluid receiving opening could both be rotated toward their respective end walls of the septic tank by about 45 degrees causing the openings to be offset relative to each other by about 180 degrees. It is readily apparent that various other orientations of the fluid introducing opening and fluid receiving opening may be selected in accordance with the present invention.

Figure 5:
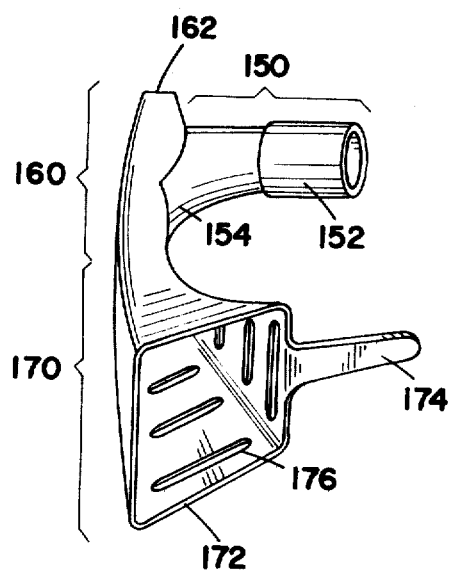
FIG. 5 is a perspective view of an alternate embodiment of a baffle in accordance with the present invention.

FIG. 5 illustrates a general purpose baffle for use as an inlet or an outlet baffle. The baffle has a first generally tubular portion 150 which has an elongated coupling 152 at one end which is adapted to be connected to a conventional four inch circular pipe. The other end is flared downward at 154 for a smoother fluid flow transition into a second generally tubular portion 160. The second generally tubular portion tapers at the top end to a vent opening 162. At its other end, the second generally tubular portion is in fluid connection with a third generally tubular portion 170. The fluid connection between the second and third generally tubular portions may be referenced as a transition zone. The third generally tubular portion is divergent from a reltively small cross section, such as a four inch square cross section, adjacent the second generally tubular portion to a relatively large cross section, such as an eight inch square cross section, adjacent its other end. The other end defines an enlarged opening 172. The opening 172 is disposed in a vertical plane which is offset from the coupling 152 by about 45 degrees. When a pair of these baffles are installed on parallel inlet and outlet pipes, the two openings are offset by 180 degrees relative to each other. A brace 174 is connected with the third generally tubular portion for fixing the minimum distance between the opening 172 and the side wall of the tank. Means, such as ribs 176, are disposed projecting into the second and third generally tubular portions for further slowing the fluid velocity. The ribs also strengthen the baffle structure. The first generally tubular portion extends along a first generally horizontal axis. The second generally tubular portion extends along a second axis which may be linear or arcuate. The second axis slopes a small amount from vertical generally toward the enlarged opening 172. The third generally tubular portion extends along a third arcuate axis.

The invention has been described with reference to the preferred embodiment. Obviously modifications and alterations will occur to others upon the reading and understanding of the specifications. It is our intention to include all such modifications and alterations insofar as they come within the scope of the appended claims or the equivalents thereof.

We claim:

1. A sewage treatment construction for minimizing fluid turbulence from the ingress of incoming sewage, the construction comprising:
   (a) a tank for holdling sewage for treatment, said tank including a first end wall which includes an inlet for receiving incoming sewage and a second end wall which includes an outlet for discharging treated fluids;
   (b) an inlet baffle structure for introducing incoming sewage into the tank, said inlet baffle structure comprising:
   (i) a first generally tubular portion which is operatively connected at one end with said inlet;
   (ii) a second generally tubular portion having a vent aperture adjacent one end, the second generally tubular portion being in fluid connection with the other end of said first generally tubular portion;
   (iii) a third generally tubular portion defining a fluid introducing opening at one end through which incoming sewage is introduced into the tank, the third tubular portion diverging toward the fluid introducing opening such that the flow rate of incoming sewage tends to be slowed as it approaches the fluid introducing opening, whereby turbulence in the tank is reduced; and
   (iv) a transition zone providing fluid connection between the other end of said second generally tubular portion and the other end of said third generally tubular portion;
   (c) an outlet baffle structure for receiving treated fluid to be discharged from the tank through said outlet, said outlet baffle structure comprising a second generally tubular structure which is in fluid connection with said outlet and which defines a fluid receiving opening through which treated fluids are received for discharge from said tank.

2. The construction as set forth in claim 1 wherein said first generally tubular portion extends along a first axis, said second generally tubular portion extends along a second axis and said third generally tubular portion extends generally along a third axis, at least said second and third axes being generally coplanar.

3. The construction as set forth in claim 2 wherein said first and second axes are substantially perpendicular and wherein said second and third axes are disposed at an angle of generally 135 degrees to 155 degrees to each other.

4. The construction as set forth in claim 2 wherein the first and second generally tubular portions are generally circular in cross section and wherein said third generally tubular portion is divergent from a generally circular cross section adjacent said second generally tubular portion to a generally oval cross section adjacent said fluid introducing opening, said fluid introducing opening being generally oval with a major axis which is substantially vertical.

5. A sewage treatment construction for minimizing fluid turbulence from the egress of treated fluids, the construction comprising:
   (a) a tank for holding sewage for treatment, said tank including a first end wall which has an inlet for receiving incoming sewage and a second end wall which has an outlet for discharging treated fluids;
   (b) an inlet baffle structure for introducing incoming sewage into the tank, said inlet baffle structure comprising a first generally tubular structure which is in fluid connection with said inlet and which incoming sewage is introduced into said tank;
   (c) an outlet baffle structure for receiving treated fluid to be discharged from the tank through said outlet, said outlet baffle structure comprises:
      (i) a first generally tubular portion which is in fluid connection at one end with said outlet;
      (ii) a second generally tubular portion having a vent aperture adjacent one end, the second generally tubular portion being in fluid connection with the other end of the first generally tubular portion;
      (iii) a third generally tubular portion defining a fluid receiving opening at one end through which treated fluid are received for discharge through the outlet, the third generally tubular portion being convergent from the fluid receiving opening toward the outlet whereby the convergence tends to reduce the velocity at which treated fluids are received, the fluid receiving opening being disposed substantially in a vertical plane such that suspended solids carried by ascending gas bubbles tend to pass by the fluid receiving opening without being received in the outlet baffle structure; and
      (iv) a transition zone providing fluid connection between the other end of said second generally tubular portion and the other end of said third generally tubular portion.

6. The construction as set forth in claim 5 wherein said first generally tubular portion extends along a first axis, said second generally tubular portion extends along a second axis and said third generally tubular portion extends along an arc segment.

7. The construction as set forth in claim 6 wherein said first and second axes are substantially perpendicular.

8. The construction as set forth in claim 5 wherein the first and second generally tubular portions are generally circular in cross section and wherein said third generally tubular portion is divergent from a generally circular cross section adjacent said second generally tubular portion to a generally oval cross section adjacent said fluid receiving opening, said fluid receiving opening being generally oval with a minor axis which is substantially vertical.

* * * * *